United States Patent
Nakayama et al.

(10) Patent No.: US 12,477,500 B2
(45) Date of Patent: Nov. 18, 2025

(54) COMMUNICATION SYSTEM, CONNECTION DESTINATION CONTROL METHOD, CONTROL APPARATUS AND PROGRAM

(71) Applicant: NTT, Inc., Tokyo (JP)

(72) Inventors: Shota Nakayama, Musashino (JP); Daisuke Murayama, Musashino (JP); Kenichi Kawamura, Musashino (JP); Takatsune Moriyama, Musashino (JP)

(73) Assignee: NTT, Inc., Tokyo (JP)

( * ) Notice: Subject to any disclaimer, the term of this patent is extended or adjusted under 35 U.S.C. 154(b) by 327 days.

(21) Appl. No.: 18/017,436

(22) PCT Filed: Jul. 27, 2020

(86) PCT No.: PCT/JP2020/028757
§ 371 (c)(1),
(2) Date: Jan. 23, 2023

(87) PCT Pub. No.: WO2022/024197
PCT Pub. Date: Feb. 3, 2022

(65) Prior Publication Data
US 2023/0300707 A1 Sep. 21, 2023

(51) Int. Cl.
*H04W 4/00* (2018.01)
*H04W 36/32* (2009.01)
*H04W 64/00* (2009.01)

(52) U.S. Cl.
CPC ......... *H04W 64/00* (2013.01); *H04W 36/322* (2023.05); *H04W 36/324* (2023.05)

(58) Field of Classification Search
CPC .. H04W 64/00; H04W 36/322; H04W 36/324
(Continued)

(56) References Cited

U.S. PATENT DOCUMENTS

| 7,392,017 B2* | 6/2008 | Chu | H04W 24/00 455/67.11 |
| 7,712,777 B2* | 5/2010 | Breed | G01S 7/417 280/735 |

(Continued)

FOREIGN PATENT DOCUMENTS

| JP | 2009182401 | 8/2009 |
| JP | 2016192693 | 11/2016 |

(Continued)

OTHER PUBLICATIONS

[No Author Listed], "4 Architecture model and concepts," 3GPP TS 23.501 V16.4.0 (Mar. 2020) (Release 16), Mar. 2020, 430 pages.

*Primary Examiner* — Amancio Gonzalez
(74) *Attorney, Agent, or Firm* — Fish & Richardson P.C.

(57) ABSTRACT

A communication system includes a terminal that communicates with a base station wirelessly; and a control device, in which the terminal includes a transmitter that transmits information on a location of the terminal, and the control device includes a processor; and a memory that includes instructions, which when executed, cause the processor to execute the following steps: acquiring the information on the location of the terminal, predicting a future location of the terminal based on the information on the location of the terminal and determining whether the terminal is to enter a dead zone by comparing the future position with the dead zone, and executing control for switching a connection destination of the terminal when the determining determines that the terminal is to enter the dead zone.

7 Claims, 15 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 8,396,470 | B2* | 3/2013 | Wormald | H04W 68/00 |
| | | | | 455/412.2 |
| 8,639,260 | B2* | 1/2014 | Fox | H04L 41/149 |
| | | | | 455/418 |
| 9,014,085 | B2* | 4/2015 | MacWan | H04W 4/00 |
| | | | | 370/328 |
| 9,020,536 | B1* | 4/2015 | Crossno | G06Q 10/0833 |
| | | | | 455/67.11 |
| 9,210,714 | B2* | 12/2015 | Egner | H04W 28/26 |
| 9,327,740 | B2* | 5/2016 | Murren | B61L 27/14 |
| 9,377,525 | B1* | 6/2016 | Pon | G01S 5/06 |
| 9,817,125 | B2* | 11/2017 | Liu | G01S 19/39 |
| 9,967,753 | B1* | 5/2018 | Jadunandan | H04W 4/24 |
| 10,330,826 | B2* | 6/2019 | Smyth | G01W 1/02 |
| 10,518,407 | B2* | 12/2019 | Williams | B25J 9/08 |
| 10,602,326 | B2* | 3/2020 | Blaha, Jr. | G08B 13/08 |
| 10,912,099 | B2 | 2/2021 | Kato et al. | |
| 11,218,887 | B2* | 1/2022 | Maheshwari | H04W 16/18 |
| 11,310,135 | B2* | 4/2022 | Brugman | H04L 41/149 |
| 11,519,734 | B2* | 12/2022 | Crolley | G01S 19/14 |
| 11,757,561 | B2* | 9/2023 | Whittaker | F41H 13/0006 |
| | | | | 89/36.16 |
| 11,849,338 | B2* | 12/2023 | Byrne | G01S 5/14 |
| 11,929,802 | B2* | 3/2024 | Xue | H01Q 19/18 |
| 11,940,306 | B2* | 3/2024 | Blaha, Jr. | G01S 5/0278 |
| 2016/0056629 | A1* | 2/2016 | Baker | H02J 3/14 |
| | | | | 315/307 |
| 2018/0352191 | A1* | 12/2018 | Eppolito | G09G 5/024 |
| 2020/0187083 | A1 | 6/2020 | Shimizu et al. | |
| 2021/0153014 | A1* | 5/2021 | Vanpariya | G06Q 20/40 |
| 2022/0388505 | A1* | 12/2022 | Sharma Banjade | |
| | | | | G08G 1/096783 |
| 2023/0041568 | A1* | 2/2023 | Pan | H04W 28/0236 |

FOREIGN PATENT DOCUMENTS

| | | |
|---|---|---|
| JP | 2019022089 | 2/2019 |
| JP | 202031401 | 2/2020 |

* cited by examiner

Fig. 8

| UEID | TIME | LOCATION | VELOCITY [km/h] |
|---|---|---|---|
| 1 | n | (a,b) | e |
| 1 | n-1 | (c,d) | f |
| 1 | n-2 | (g,h) | i |
|  |  | ⋮ |  |
|  |  |  |  |

Fig. 11

| DETECTION POINT | DETECTION POSITION | DEAD ZONE |
|---|---|---|
| DEAD POINT 1 | (p,q) | (p-R~p+R,q-R~q+R) |
| DEAD POINT 2 | (r,s) | (r-R~r+R,s-R~s+R) |
| DEAD POINT 3 | (t,u) | (t-R~t+R,u-R~u+R) |

⋮

COMMUNICATION SYSTEM, CONNECTION DESTINATION CONTROL METHOD, CONTROL APPARATUS AND PROGRAM

CROSS-REFERENCE TO RELATED APPLICATIONS

This application is a National Stage application under 35 U.S.C. § 371 of International Application No. PCT/JP2020/028757, having an International Filing Date of Jul. 27, 2020. The disclosure of the prior application is considered part of the disclosure of this application, and is incorporated by reference in its entirety into this application.

TECHNICAL FIELD

The present invention relates to a technique for avoiding deterioration in communication quality and communication interruption in a wireless communication system.

BACKGROUND ART

In 3GPP, standardization (for example, Non Patent Literature 1) of a wireless communication system referred to as 5G is progressing, and 5G communication services have started. In addition, the study and introduction of local 5G (L5G), which is a local 5G system constructed by companies and local governments, is also progressing.

5G has features such as ultra-high speed, ultra-low latency, and multiple simultaneous connections, and is expected to be used for various wireless access. In particular, in L5G, utilization of mission critical applications is also assumed, and maintenance of communication quality is more strictly required. Since the introduction cost of L5G is high as compared with other wireless systems (wireless LAN) and the like, it is assumed that L5G will be introduced in limited areas such as by limiting the number of base stations.

CITATION LIST

Non Patent Literature

[Non Patent Literature 1] 3GPP TS 23.501 V16.4.0 (2020-03) (Release 16), "4 Architecture model and concepts"

SUMMARY OF INVENTION

Technical Problem

In 5G, frequencies in the 3.7 GHz band, 4.5 GHz band, and 28 GHz band are used, and in L5G, frequencies in the 4.5 GHz band and 28 GHz band are used.

However, in the high frequency band such as the millimeter wave band (28.2 to 29.1 GHz), the radio waves highly tend to travel linearly, and, thus, areas or dead zone may occur where it is difficult for radio waves to reach due to blocking objects or columns of buildings. When the terminal (UE) has entered an area or a dead zone where it is difficult for radio waves to reach, communication quality may deteriorate (including communication interruption).

The present invention has been made in view of the above-described points, and an object thereof is to provide a technique for avoiding deterioration in communication quality caused by a terminal entering a dead zone in a wireless communication system.

Solution to Problem

According to the disclosed technique, there is provided a communication system including: a terminal that communicates with a base station wirelessly; and a control device, in which the terminal includes a transmission unit that transmits information on a location of the terminal, and the control device includes an information collection unit that acquires information on the location of the terminal, an entry prediction calculation unit that predicts a future location of the terminal based on information on the location of the terminal and that determines whether the terminal is to enter a dead zone by comparing the future location with the dead zone, and a connection destination control unit that executes control for switching a connection destination of the terminal when the entry prediction calculation unit determines that the terminal is to enter the dead zone.

Advantageous Effects of Invention

According to the disclosed technique, a technique can be provided that is for avoiding deterioration in communication quality caused by a terminal entering a dead zone in a wireless communication system.

BRIEF DESCRIPTION OF DRAWINGS

FIG. 8 is a diagram illustrating an example of a DB storing the UE information.
FIG. 11 is a diagram illustrating an example of a DB storing dead zone information.

DESCRIPTION OF EMBODIMENTS

Hereinafter, an embodiment (the present embodiment) of the present invention will be described with reference to the drawings. The embodiment described below is merely an example, and the embodiment to which the present invention is applied is not limited to the following embodiment.

In the present embodiment, the "dead zone" is an area where it is difficult for radio waves to reach from a base station. The "area where it is difficult for radio waves to reach" is, for example, an area (including an area where radio waves do not reach at all) where only radio waves with a power equal to or less than a certain threshold value can reach. In the following description, the terminal is described as UE. The UE is an abbreviation of User Equipment.

Problem and Overview of Embodiment

Next, an operation when the technique according to the present embodiment is not applied will be described with reference to FIG. 1 and FIG. 2.

Figure 1:
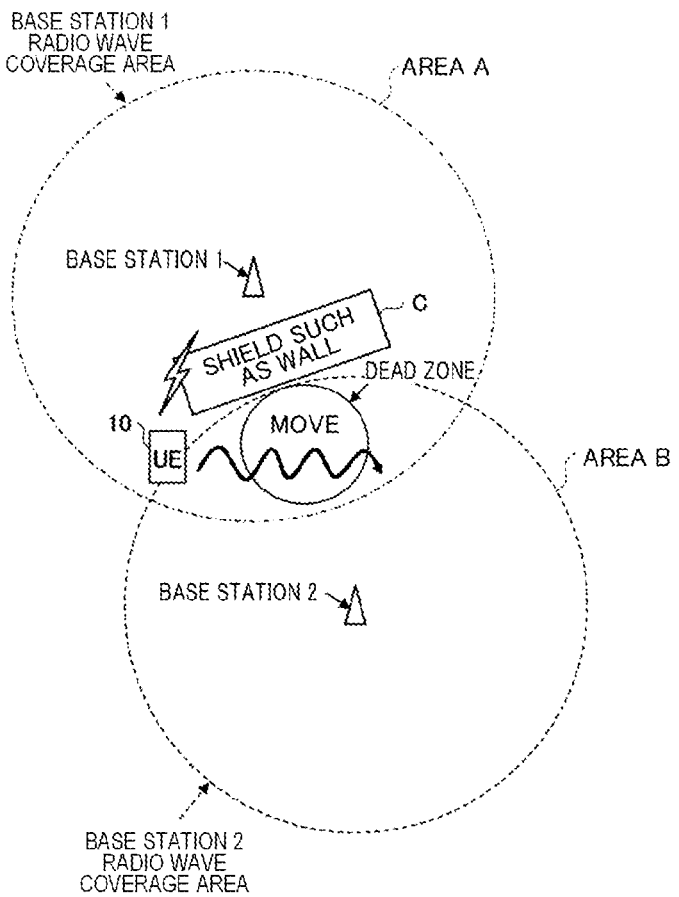
FIG. 1 is a view for describing a problem.

As illustrated in FIG. 1, a base station 1 and a base station 2 exist, and a radio wave coverage area of the base station 1 and a radio wave coverage area of the base station 2 are illustrated as an area A and an area B, respectively. In a state illustrated in FIG. 1, a terminal 10 is connected to the base station 1. A blocking object C such as a wall exists at the position illustrated in the drawing, and an area behind the blocking object C when viewed from the base station 1 is a dead zone.

Figure 2:
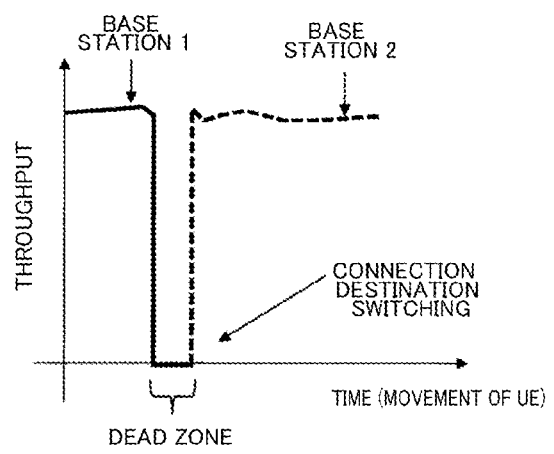
FIG. 2 is a diagram for describing a problem.

FIG. 2 illustrates a change in communication quality (for example, throughput in the UE 10) when the UE 10 passes through the dead zone and moves to the area B. As illustrated in FIG. 2, the throughput becomes 0 while the UE 10 is passing through the dead zone.

In the present embodiment, in order to avoid deterioration in communication quality due to entry into a dead zone, a control device 100 described below, predicts the entry of the UE 10 into the dead zone, performs connection switching to another line (another base station or the like) with respect to the UE 10 in advance, and implements duplication by using the connection of a plurality of lines. Hereinafter, the present embodiment will be described in more detail.

(System Configuration)

Figure 3:
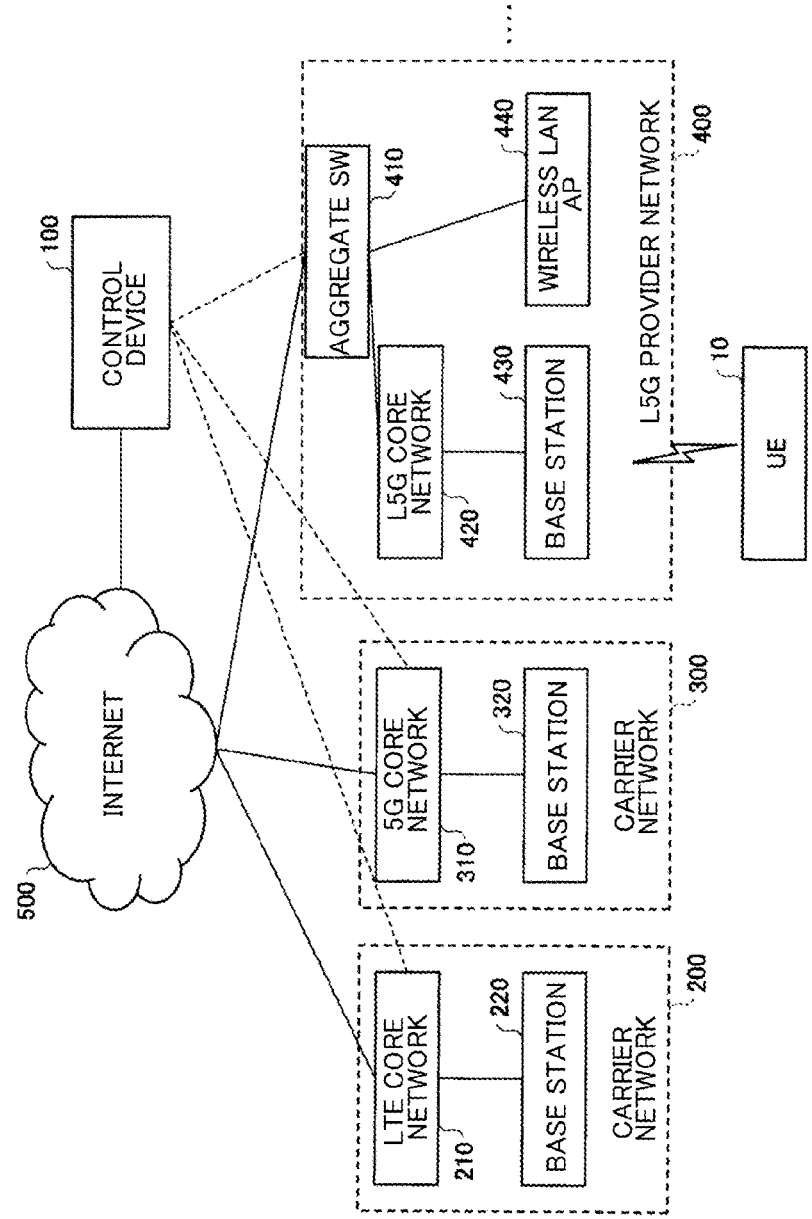
FIG. 3 is a system configuration view according to an embodiment of the present invention.

FIG. 3 illustrates an overall configuration example of a communication system according to the present embodiment. As illustrated in FIG. 3, the system includes the control device 100, a carrier network 200, a carrier network 300, and an L5G provider network 400, and these are connected to Internet 500. Furthermore, the UE 10 performs communication with a base station 430 or the like of the L5G provider network 400 wirelessly according to the position.

The carrier network 200 includes an LTE core network 210 and a base station 220. Although only one base station is illustrated in each network in FIG. 3, this is for convenience of illustration, and multiple base stations may actually exist.

The carrier network 300 includes a 5G core network 310 and a base station 320. The L5G provider network 400 includes an aggregate SW 410, an L5G core network 420, the base station 430, and a wireless LAN-AP 440.

In any of the carrier network 200, the carrier network 300, and the L5G provider network 400, a plurality of wireless systems such as wireless LAN-AP and IoT terminals may be included in the network. FIG. 3 illustrates an example of a case where the wireless LAN-AP 440 exists in the L5G provider network 400.

The control device 100 is a device for executing control processing according to the present invention, and is a virtual server provided on a cloud or a physical server provided on a physical network. The disposition location of the control device 100 is not limited to a specific location, and the disposition location may be determined according to the control range. For example, when it is assumed that the UE 10 connected to the L5G provider network 400 is to be controlled, the control device 100 may be installed at a place close to the L5G provider network 400.

Information from the UE 10 is transmitted to the control device 100 via the wireless systems (LTE, 5G, L5G, wireless LAN, IoT terminals and the like) of connection destinations.

(Overview of Operation)

Figure 4:
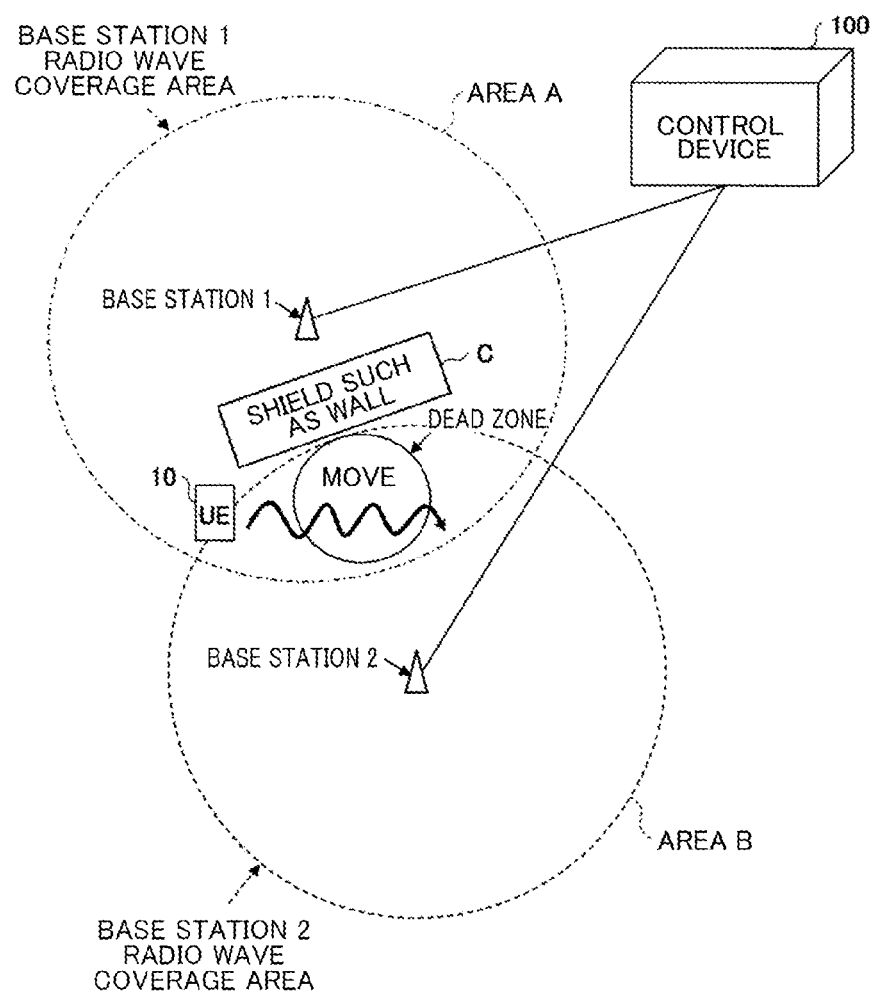
FIG. 4 is a view for describing an overview of an operation of a system according to the embodiment of the present invention.
Figure 5:
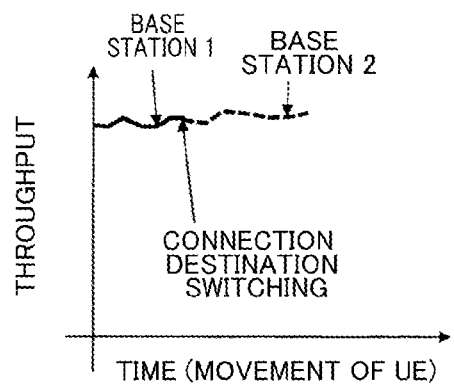
FIG. 5 is a diagram for describing an overview of an operation of the system according to the embodiment of the present invention.

An overview an operation of the system according to the present embodiment will be described with reference to FIG. 4 and FIG. 5. In FIG. 4, as in FIG. 1, the base station 1 and the base station 2 exist, and the radio wave coverage areas of the base stations 1 and 2 are illustrated as the area A and the area B, respectively. The blocking object C such as a wall exists at the position illustrated in the drawing, and an area behind the blocking object C when viewed from the base station 1 is a dead zone of the base station 1. The base station 1 and the base station 2 may be any of the carrier networks 200 and 300 and the L5G provider network 500, respectively. The base station 1 and the base station 2 may be a wireless LAN-AP, respectively.

In such an environment, the UE 10 moves from the area A to the area B through a dead zone.

The control device 100 stores location information of the dead zone. The control device 100 estimates a future location of the UE 10 based on UE information such as location information collected from the UE 10, and determines whether or not the UE 10 has entered the dead zone by comparing the future location of the UE 10 with the location of the dead zone. The "future location of the UE 10" is a location at the future time of the UE 10 n seconds ahead of the current time, and "n" may be predetermined, or "n" may be determined according to the velocity of the UE 10.

When it is determined that the UE 10 enters the dead zone, for example, the control device 100 instructs the UE 10 to switch the line from the base station 1 to the base station 2. The control device 100 may instruct the UE 10 to be connected to both the base station 1 and the base station 2 to use a duplication line. The above-described instruction for line switching and the use of the duplication line may be given to the base station 1.

Since the UE 10 can communicate with the base station 2 before entering the dead zone by an instruction from the control device 100, deterioration of communication quality due to the dead zone with respect to the base station 1 can be avoided. Accordingly, as illustrated in FIG. 5, the connection destination from the base station 1 to the base station 2 can be switched without deterioration in communication quality.

(Dead Zone Entry Prediction Method)

Figure 6:
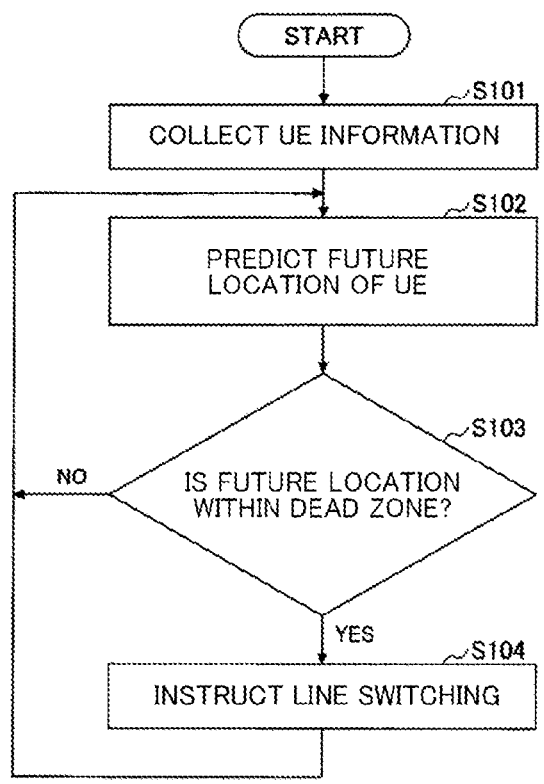
FIG. 6 is a flowchart for describing a dead zone entry prediction method.
Figure 7:
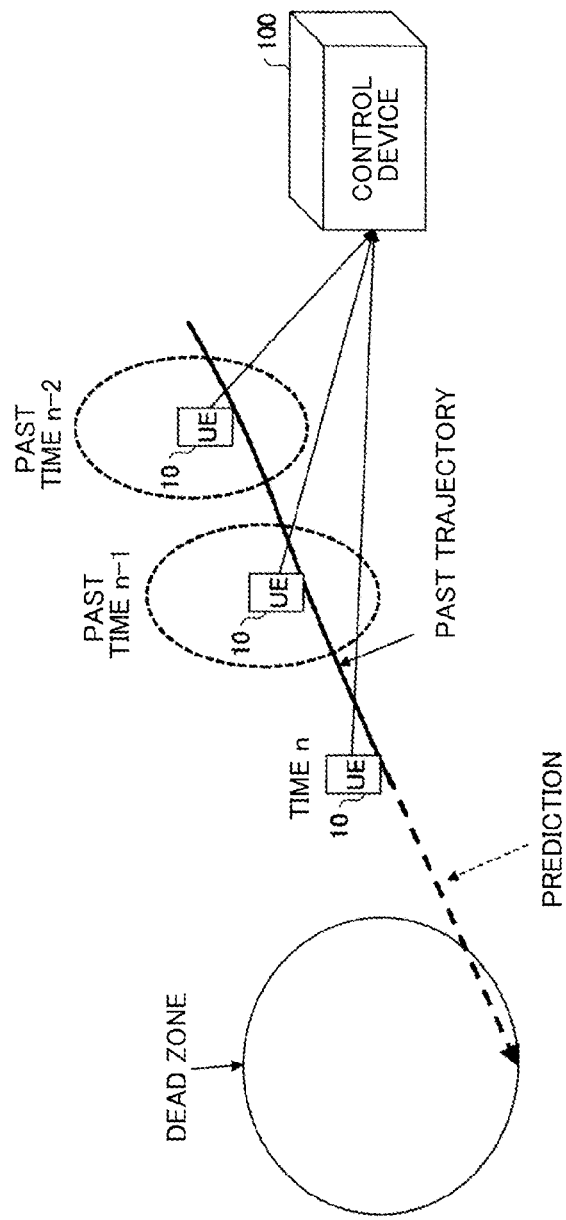
FIG. 7 is a view illustrating collection of UE information.

An example of the processing details of the control device 100 for predicting the entry of the UE 10 into the dead zone and switching the line will be described more specifically along the procedure of the flowchart of FIG. 6. FIGS. 7 and 8 are also referred to as appropriate.

<S101>

In S101, the control device 100 periodically collects the UE information (information on a location such as location information and velocity), and stores the information in a DB (database). FIG. 7 illustrates that the location information of the UE 10 has been collected at the current time n and the past times n−1 and n−2.

In the present embodiment, it is assumed that the UE 10 is equipped with a GPS device and the location information obtained by the GPS device is transmitted from the UE 10 to the control device 100, but the method for collecting the location information is not limited to this method. For example, a sensor provided around the UE 10 (on a road side) may acquire the location information of the UE 10 and transmit the location information to the control device 100.

The location information of the UE 10 collected by the control device 100 is, for example, x-y coordinates and latitude and longitude, but is not limited thereto, and may be three-dimensional location information including a height.

Further, the control device 100 may collect velocity information in addition to the location information of the UE 10. The location information of the UE 10 and the atmospheric pressure sensor information (atmospheric pressure at the location of the UE 10) at the location of the UE 10 may be collected. The control device 100 may collect location information of the UE 10, velocity information of the UE 10, and atmospheric pressure sensor information at the location of the UE 10. The control device 100 can acquire a location of the UE 10 in the height direction from the atmospheric pressure sensor information. The location in the height direction can be used when considering the location of the UE 10 three-dimensionally, such as a case of a location inside a building. The control device 100 may collect a radio wave intensity from a base station in the UE 10, from the UE 10. The atmospheric pressure sensor information may be information on an atmospheric pressure sensor included in the UE 10 or information on an atmospheric pressure sensor included in the vicinity of the UE 10.

When collecting the location information and the velocity information from the UE 10, the control device 100 stores the collected information in the DB, for example, in a form illustrated in FIG. 8. In the example illustrated in FIG. 8, a UE ID, time, location, and speed are stored in the DB.

<S102>

In S102, the control device 100 predicts the future location of the UE 10 by using past and current location information or the like of the UE 10.

Although the future location prediction method is not limited to a particular method, the future location can be predicted by linear function interpolation, for example. In this case, for example, the location after t seconds can be estimated from the current location (a, b), the sample location (c, d) at the previous time, and the current speed e. In other words, the current traveling direction can be estimated from the current location (a, b) and the sample location (c, d) at the previous time, and the location of the UE 10 after t seconds can be predicted to be at the location advanced by ext in this direction. Instead of the linear function interpolation, the n-th order function interpolation (n is an integer greater than or equal to 2) may be used.

Further, a future location of the UE 10 may be predicted by using a plurality of past samples by linear function fitting (minimum squares method). Further, the estimation of the location after t seconds may be estimation of the location after 1 second, the location after 2 seconds, . . . , and the location after t seconds (that is, the location after t seconds).

<S103>

In S103, the control device 100 compares the future location of the UE 10 predicted in S102 with a dead zone in a base station to which the UE 10 is connected. For example, when the dead zone is an area expressed by a circle, the control device 100 determines whether or not the future location of the UE 10 is in the circle. In S103, when it is determined that the future location of the UE 10 is within the dead zone, the process proceeds to S104. In addition to the determination of whether or not the future location of the UE 10 is within the dead zone, it may be determined whether or not the current location of the UE 10 is within the dead zone.

<S104>

In S104, the control device 100 transmits a line switching instruction to the UE 10 (or the connected base station of the UE 10). As described above, the duplication line connection may be instructed.

(Dead Zone Computation Method)

Next, the dead zone computation method will be described. In the present embodiment, the control device 100 performs the dead zone computation processing, but this is an example. A device other than the control device 100 may perform the dead zone computation processing, and the control device 100 may receive information on the dead zone from the device.

Figure 9:
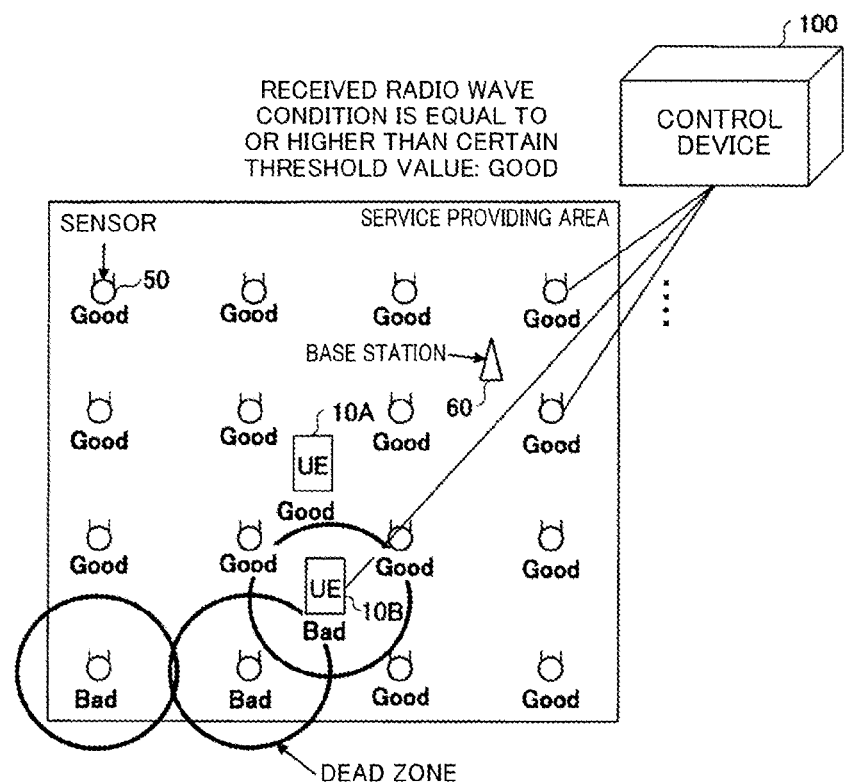
FIG. 9 is a view for describing a dead zone computation method.

In the present embodiment, as illustrated in FIG. 9, a plurality of sensors 50 are arranged in the service providing area. The service providing area is a service providing area of the base station. FIG. 9 illustrates, as an example, the service providing area of the base station 60.

Each sensor 50 has a function of measuring reception quality and feeding back the measurement result to the control device 100. Each of the UE (in FIG. 9, UE 10A and UE 10B are illustrated) also has a function of measuring the reception quality and feeding back the measurement result to the control device 100.

The sensor 50 and the base stations 60 may be wirelessly connected, or connected by wire. When the sensor 50 and the base station 60 are wirelessly connected, each sensor 50 has a communication function with a base station similar to the UE 10, and can transmit a feedback signal to the base station 60 by using a user data area or a control message by allocation from the base station 60.

Next, an example of a procedure for computing the dead zone will be described with reference to the flowchart of FIG. 10.

Figure 10:
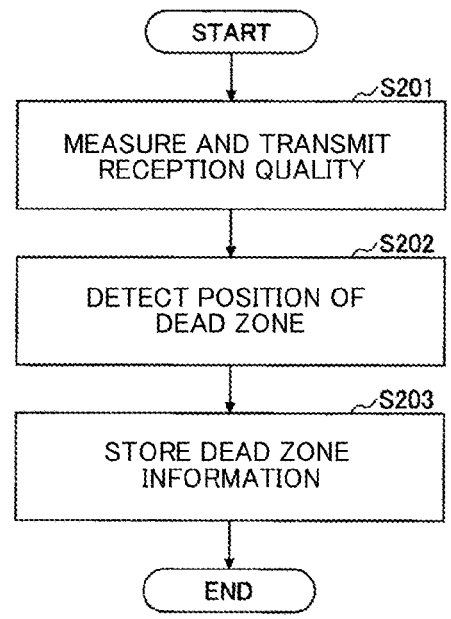
FIG. 10 is a flowchart for describing the dead zone computation method.

As an assumption of the processing illustrated in FIG. 10, it is assumed that the control device 100 already stores the location information of each sensor 50. The processing illustrated in FIG. 10 is executed for each base station. In other words, the information of the dead zone is obtained for each base station. The processing illustrated in FIG. 10 is periodically executed. In other words, the information of the dead zone is periodically updated.

<S201>

In S201, each sensor 50 measures the reception quality (received radio wave information) and transmits the reception quality to the control device 100. Each of the UE 10 transmits its own location information and reception quality to the control device 100.

The reception quality is, for example, one of SS-RSRP, CSI-RSRP, NR-RSSI, CSI-RSSI, SS-RSRQ, CSI-RSRQ, SS-SINR, and CSI-SINR, or any combination thereof. For the transmission of the reception quality, the uplink communication of the target wireless system may be used, or another access means such as a wired connection or a wireless LAN may be used.

<S202>

In S202, the control device 100 determines the position where the dead zone is detected based on the received reception qualities and location information associated with the sensor 50 of a transmission source of the reception quality.

For example, when the reception quality received from a sensor at a certain position is higher than or equal to a predetermined threshold value, the control device 100 determines that the received radio wave condition at this position is good, and when the reception quality is less than the predetermined threshold value, the control device 100 determines that the received radio wave condition at this position is bad.

The control device 100 determines a position at which the state of the received radio waves is determined to be bad, as a position of a dead zone. Although it is assumed that the position is a two-dimensional position such as x-y coordinates and longitude and latitude, when an indoor facility or the like is a target, the three-dimensional position may be a target by adding the height direction (z-axis direction). In a case of a three-dimensional position, the dead zone has a three-dimensional shape (for example, a sphere).

<S203>

In S203, the control device 100 determines a range of a radius R centered at the position at which the dead zone is detected as a dead zone and stores the information (for example, a radius and a center position of a circle) on the dead zone in the DB. R is a predetermined value. In addition, setting a dead zone in this manner is an example.

FIG. 11 illustrates a diagram of information on the dead zone stored in the DB. In the example illustrated in FIG. 11, the location information and the dead zone is stored for each detected dead point. In FIG. 11, for example, (p−R to p+R, q−R to q+R) means a circle having the radius R centered at (p, q).

(Device Configuration Example and Operation Example of Control Device)

Figure 12:
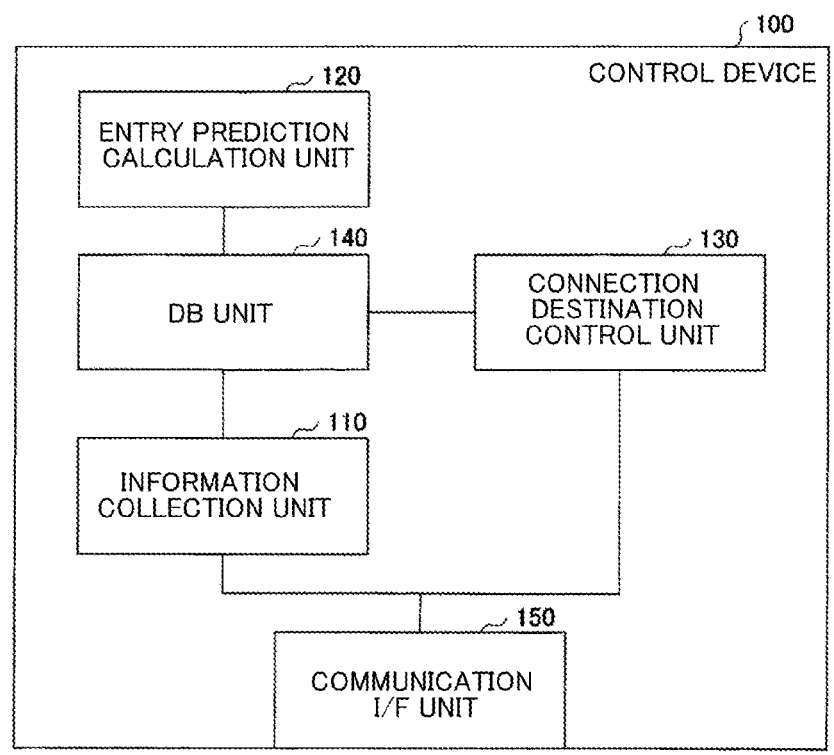
FIG. 12 is a functional configuration view of a control device 100.

Next, a device configuration example of the control device 100 for executing the above-described processing will be described. FIG. 12 is a view illustrating an example of a functional configuration of the control device 100. As illustrated in FIG. 12, the control device 100 includes an information collection unit 110, an entry prediction calculation unit 120, a connection destination control unit 130, a DB unit 140, and a communication I/F unit 150.

The information collection unit 110 collects UE information (position, velocity, intensity of radio waves received from a base station, atmospheric pressure information, and the like). When the control device 100 is to compute a dead zone, the information collection unit 110 collects reception quality from the sensor 50 and the UE 10, and computes the dead zone. When the control device 100 is not to compute the dead zone, the information collection unit 110 receives information on the computed dead zone from another device.

The entry prediction calculation unit 120 predicts a future UE location by using past and current UE information. The connection destination control unit 130 compares the predicted location of the UE with the dead zone, and transmits an instruction to perform switching to a UE for which switching is required. The method of predicting the UE position is as described above. The switching instruction may be transmitted to the base station and the wireless LAN-AP.

The DB unit 140 has the DB (for example, FIGS. 8 and 11) for storing the information collected or computed by the information collection unit 110. The communication I/F unit 150 performs transmission and reception of data.

Figure 13:
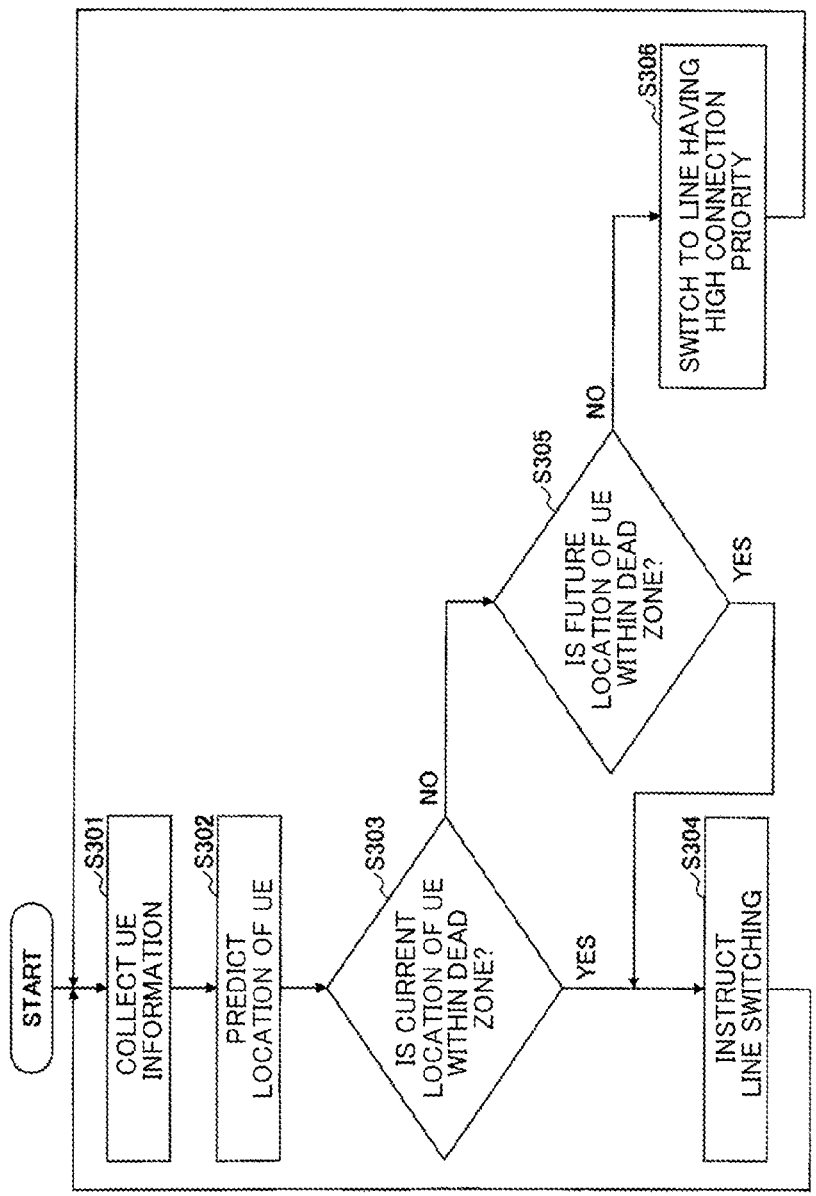
FIG. 13 is a flowchart for describing an operation of the control device 100.

An operation example of the control device 100 having the above configuration will be described with reference to the flowchart of FIG. 13. In the following flow, it is assumed that the dead zone information is stored in the DB unit 140 in advance. In the following flow, the connection priority of the wireless system is provided, and the connection priority is set in the control device 100.

In S301, the information collection unit 110 collects UE information (location, velocity, radio wave intensity from a base station, atmospheric pressure information and the like) from the UE 10.

In S302, the entry prediction calculation unit 120 predicts the future location of the UE 10 by the above-described method. In S303, the entry prediction calculation unit 120 determines whether or not the current position of the UE 10 is within the dead zone of the base station, which is a connection destination of the UE 10.

When the determination result of S303 is YES, the process proceeds to S304, and the connection destination control unit 130 transmits an instruction for switching (or setting a duplication configuration) the connection line of the UE 10, to the UE 10 (or base station which is the connection destination).

When the determination result of S303 is NO, the process proceeds to S305, and the entry prediction calculation unit 120 determines whether or not the future location of the UE 10 is within the dead zone of the base station, which is the connection destination of the UE 10. When the determination result of S305 is YES, the process proceeds to S304, and the connection destination control unit 130 instructs a line switching.

When the determination result of S305 is NO, the process proceeds to S306, and the connection destination control unit 130 instructs the UE 10 (or the connection destination base station) to perform switching to a line with high connection priority. For example, regarding the L5G and the wireless LAN, suppose that the control device 100 sets the priority levels so that the L5G has higher priority. In this case, when the UE 10 is connected to the wireless LAN, switching to the L5G is instructed. In addition, S306 may not be performed.

Modified Example

In the example described above, the control device 100 determines the entry of the UE 10 into the dead zone and instructs the line switching, but this is an example. The UE 10 may determine the entry into the dead zone and perform the line switching. The UE that determines the entry into the dead zone and performs the line switching may be referred to as a "control device".

Figure 14:
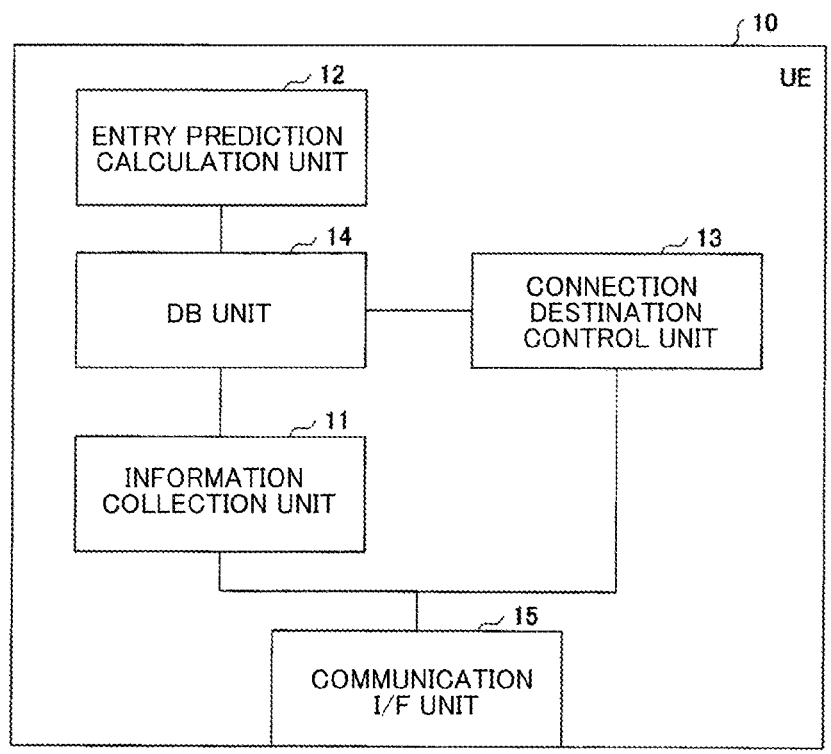
FIG. 14 is a functional configuration view of a UE 10.

FIG. 14 illustrates a configuration example of the UE 10 when the UE 10 performs the line switching and determines the entry into the dead zone. As illustrated in FIG. 14, the configuration of the UE 10 is the same as that of the control device 100. In other words, as illustrated in FIG. 14, the UE 10 includes the information collection unit 11, the entry prediction calculation unit 12, the connection destination control unit 13, the DB unit 14, and the communication I/F unit 15. The functions of the respective units are the same as those of the corresponding functional units in the control device 100, and are as follows.

The information collection unit 11 includes, for example, a position sensor such as GPS, a speed sensor, an acceleration sensor, and the like, and collects the UE information (position, speed, radio wave intensity from a base station, atmospheric pressure information, and the like) of the UE 10. When the UE 10 computes the dead zone, the information collection unit 110 collects reception quality from the sensor 50 and another UE 10, and computes the dead zone. When the UE 10 does not compute the dead zone, the information collection unit 11 receives information on the computed dead zone from another device.

The entry prediction calculation unit 12 predicts a future UE location by using past and current UE information. The connection destination control unit 13 compares the predicted location of the UE with the dead zone, and performs switching when switching is required. Otherwise, an instruction may be transmitted to the connected base station or the wireless LAN-AP to perform switching.

The DB unit 14 has a DB (for example, FIGS. 8 and 11) for storing the information collected or computed by the information collection unit 11. The communication I/F unit 15 performs transmission and reception of data. The operation of the UE 10 in Modified Example 1 is the same as that of the control device 100 illustrated in FIG. 13.

(Hardware Configuration Example)

Each of the control device 100 and the UE 10 in the present embodiment (including a modification example) can be implemented by, for example, causing a computer to execute a program describing the processing details described in the present embodiment. In addition, the "computer" used as the control device 100 may be a physical machine or a virtual machine in the cloud. When using a virtual machine, the "hardware" described here is virtual hardware.

The program can be recorded on a computer-readable recording medium (a portable memory or the like), stored, and distributed. It is also possible to provide the program through a network such as the Internet or e-mail.

Figure 15:
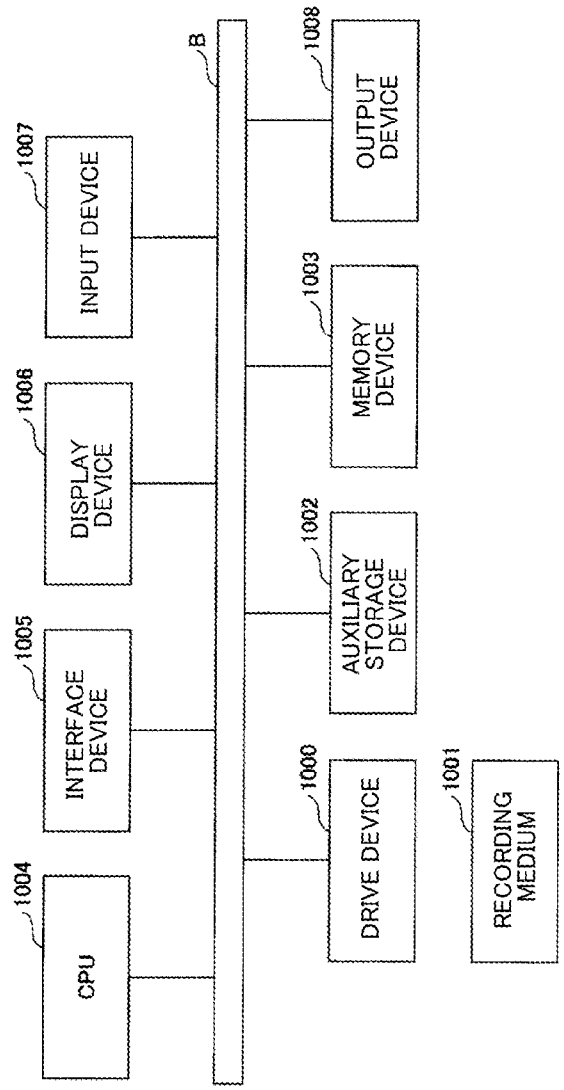
FIG. 15 is a view illustrating a hardware configuration example of devices.

FIG. 15 is a view illustrating a hardware configuration example of the computer. The computer of FIG. 15 includes a drive device 1000, an auxiliary storage device 1002, a memory device 1003, a CPU 1004, an interface device 1005, a display device 1006, an input device 1007, an output device 1008, and the like, which are connected to each other by a bus BS.

A program for implementing processing in the computer is provided by, for example, a recording medium 1001 such as a CD-ROM or a memory card. When the recording medium 1001 having the program stored therein is set in the drive device 1000, the program is installed in the auxiliary storage device 1002 from the recording medium 1001 via the drive device 1000. However, the program does not necessarily have to be installed from the recording medium 1001, and may be downloaded from another computer via a network. The auxiliary storage device 1002 stores the installed program and also stores necessary files, data, and the like.

The memory device 1003 reads and stores the program from an auxiliary storage device 1002 when there is an instruction to start the program. The CPU 1004 implements the function related to the control device 100 or the UE 10 according to the program stored in the memory device 1003. The interface device 1005 is used as an interface for connecting to a network, and functions as a transmitting unit and a receiving unit. The display device 1006 displays a graphical user interface (GUI) or the like according to the program. The input device 1007 is configured of a keyboard, a mouse, buttons, a touch panel, or the like, and is used to input various operation instructions. The output device 1008 outputs the result of the arithmetic operation.

Effects of Embodiment

With the technique according to the present embodiment described above, before the UE 10 enters the dead zone, it is possible to switch to another line and to make duplication by connecting a plurality of lines, and it is possible to avoid deterioration in communication quality and temporary interruption.

Conclusion of Embodiment

In the present specification, the communication system, the connection destination control method, the control device, and the program described at least in each of the following items are described.

(Item 1)

A communication system including: a terminal that communicates with a base station wirelessly; and
  a control device, wherein
  the terminal includes a transmission unit that transmits information on a location of the terminal, and
  the control device includes
  an information collection unit that acquires the information on the location of the terminal,
  an entry prediction calculation unit that predicts a future location of the terminal based on the information on the location of the terminal and that determines whether the terminal is to enter a dead zone by comparing the future location with the dead zone, and
  a connection destination control unit that executes control for switching a connection destination of the terminal when the entry prediction calculation unit determines that the terminal is to enter the dead zone.

(Item 2)

The communication system according to item 1, in which the information on the location of the terminal includes location information of the terminal, velocity information of the terminal, and atmospheric pressure sensor information at the location of the terminal.

(Item 3)

The communication system according to item 1 or 2, in which the information collection unit computes the dead zone based on reception quality received from a plurality of sensors.

(Item 4)

A connection destination control method in a communication system including a terminal that communicates with a base station wirelessly, and a control device, in which the terminal transmits information on a location of the terminal, and
  the control device
  acquires information on a location of the terminal, predicts a future location of the terminal based on the location information of the terminal and determines whether the terminal is to enter a dead zone by comparing the future location with the dead zone, and
  executes control for switching a connection destination of the terminal when it is determined that the terminal is to enter the dead zone.

(Item 5)

A control device in a communication system including a terminal that communicates with a base station wirelessly and the control device, the control device including:
  an information collection unit that acquires information on a location of the terminal;
  an entry prediction calculation unit that predicts a future location of the terminal based on the information on the location of the terminal and that determines whether the terminal is to enter a dead zone by comparing the future location with the dead zone; and
  a connection destination control unit that executes control for switching a connection destination of the terminal when the entry prediction calculation unit determines that the terminal is to enter the dead zone.

(Item 6)

The control device according to item 5, in which the information on the location of the terminal includes location information of the terminal, velocity information of the terminal, and atmospheric pressure sensor information at the location of the terminal.

(Item 7)

The control device according to item 5 or 6, in which the information collection unit computes the dead zone based on reception quality received from a plurality of sensors.

(Item 8)

A program for causing a computer to function as each unit of the control device according to any one of items 5 to 7.

Although the embodiment has been described above, the present invention is not limited to such a specific embodiment, and various modifications and changes can be made within the scope of the gist of the present invention described in the claims.

REFERENCE SIGNS LIST

10 Terminal (UE)
11 Information collection unit
12 Entry prediction calculation unit
13 Connection destination control unit
14 DB unit
15 Communication I/F unit
50 Sensor
60, 220, 320, 430 Base station
100 Control device
110 Information collection unit
120 Entry prediction calculation unit
130 Connection destination control unit
140 DB unit
150 Communication I/F unit
200, 300 Carrier network
210 LTE core network
310, 420 5G core network
400 L5G provider network
500 Internet
410 Aggregate SW
440 Wireless LAN-AP
1000 Drive device
1001 Recording medium
1002 Auxiliary storage device
1003 Memory device
1004 CPU
1005 Interface device
1006 Display device
1007 Input device
1008 Output device

The invention claimed is:

1. A communication system comprising:
a terminal that communicates with a base station wirelessly; and
a control device, wherein
the terminal includes a transmitter configured to transmit information on a location of the terminal, and
the control device includes a processor; and
a memory that includes instructions, which when executed, cause the processor to:
acquire the information on the location of the terminal;
determine, using a plurality of sensors located in a service area, a dead zone according to a received signal quality from each sensor of the plurality of sensors;
predict a future location of the terminal based on the information on the location of the terminal and determine whether the terminal is to enter the dead zone by comparing the future location with the dead zone;
execute control for duplicating a connection destination of the terminal for when the processor determines that the terminal is to enter the dead zone; and
instruct the terminal to perform switching to a line with a high connection priority, when the processor determines that the terminal is not to enter the dead zone.

2. The communication system according to claim 1, wherein the information on the location of the terminal includes location information of the terminal, velocity information of the terminal, and atmospheric pressure sensor information at the location of the terminal.

3. The communication system according to claim 1, wherein the instructions, which when executed, cause the processor to compute the dead zone based on reception quality received from a plurality of sensors.

4. A connection destination control method in a communication system including a terminal that communicates with a base station wirelessly, and a control device, the method comprising:
transmitting, by the terminal, information on a location of the terminal;
acquiring, by the control device, information on a location of the terminal;
determining, using a plurality of sensors located in a service area, a dead zone according to a received signal quality from each sensor of the plurality of sensors;
predicting, by the control device, a future location of the terminal based on the information on the location of the terminal and determining, by the control device, whether the terminal is to enter the dead zone by comparing the future location with the dead zone;
executing, by the control device, control for duplicating a connection destination of the terminal when the control device determines that the terminal is to enter the dead zone; and
instructing, by the control device, the terminal to perform switching to a line with high connection priority, when the control device determines that the terminal is not to enter the dead zone.

5. A control device in a communication system including a terminal that communicates with a base station wirelessly and the control device, the control device comprising:
a processor; and
a memory that includes instructions, which when executed, cause the processor to:
acquire information on a location of the terminal;
determine, using a plurality of sensors located in a service area, a dead zone according to a received signal quality from each sensor of the plurality of sensors;
predict a future location of the terminal based on the information on the location of the terminal and determine whether the terminal is to enter the dead zone by comparing the future location with the dead zone;
execute control for duplicating a connection destination of the terminal when the processor determines that the terminal is to enter the dead zone; and instruct the terminal to perform switching to a line with high connection priority, when the processor determines that the terminal is not to enter the dead zone.

6. The control device according to claim 5, wherein the information on the location of the terminal includes location information of the terminal, velocity information of the terminal, and atmospheric pressure sensor information at the location of the terminal.

7. A non-transitory computer readable storage medium storing a program, which when executed, causes a computer to function as the control device according to claim 5.

\* \* \* \* \*